(12) United States Patent
Theiss (10) Patent No.: US 9,739,108 B2
(45) Date of Patent: Aug. 22, 2017

(54) SEAL DELIVERY SYSTEM

(71) Applicant: ONESUBSEA IP UK LIMITED, London (GB)

(72) Inventor: David H. Theiss, Houston, TX (US)

(73) Assignee: OneSubsea IP UK Limited, London (GB)

( * ) Notice: Subject to any disclaimer, the term of this patent is extended or adjusted under 35 U.S.C. 154(b) by 295 days.

(21) Appl. No.: 14/474,498

(22) Filed: Sep. 2, 2014

(65) Prior Publication Data

US 2016/0060990 A1    Mar. 3, 2016

(51) Int. Cl.
| | | |
|---|---|---|
| *E21B 33/02* | (2006.01) | |
| *E21B 41/04* | (2006.01) | |
| *E21B 33/00* | (2006.01) | |

(52) U.S. Cl.
CPC .............. *E21B 33/02* (2013.01); *E21B 41/04* (2013.01); *E21B 2033/005* (2013.01)

(58) Field of Classification Search
CPC ........................................................ E21B 33/02
See application file for complete search history.

(56) References Cited

U.S. PATENT DOCUMENTS

| | | | | |
|---|---|---|---|---|
| 4,548,273 A | * | 10/1985 | Leicht .................... | E21B 33/043 166/123 |
| 4,564,068 A | * | 1/1986 | Baugh .................... | E21B 33/043 166/123 |
| 4,595,053 A | * | 6/1986 | Watkins .................. | E21B 33/04 166/115 |
| 4,742,874 A | * | 5/1988 | Gullion .................. | E21B 33/043 166/115 |
| 4,823,871 A | * | 4/1989 | McEver ................. | E21B 33/043 166/182 |
| 5,038,865 A | * | 8/1991 | Taylor ..................... | E21B 17/00 166/182 |
| 5,121,793 A | * | 6/1992 | Busch ..................... | E21B 33/02 166/79.1 |
| 5,238,022 A | * | 8/1993 | Zink ....................... | F16K 27/07 137/554 |
| 6,367,554 B1 | * | 4/2002 | Theiss .................... | E21B 17/01 166/365 |
| 6,666,276 B1 | * | 12/2003 | Yokley ................... | E21B 23/01 166/118 |
| 6,910,409 B2 | * | 6/2005 | Yamamoto ............ | F16H 19/043 92/117 R |
| 6,966,381 B2 | * | 11/2005 | Stjernstrom .......... | E21B 33/035 166/250.08 |
| 7,703,525 B2 | * | 4/2010 | Wilcox .................. | E21B 43/116 166/123 |
| 8,678,110 B2 | * | 3/2014 | Cenac ..................... | E21B 21/10 166/319 |

(Continued)

FOREIGN PATENT DOCUMENTS

WO    WO2013/040709    *    3/2013    ............ E21B 33/12

*Primary Examiner* — Matthew R Buck
*Assistant Examiner* — Aaron Lembo
(74) *Attorney, Agent, or Firm* — Fletcher Yoder, P.C.

(57) ABSTRACT

A system including a seal delivery system, including a mandrel, a seal tool coupled to the mandrel, wherein the seal tool is configured to deliver and actuate a bridge seal assembly, and a gear system coupled to the mandrel and to the seal tool, wherein the gear system is configured to rotate the seal tool from a first position to a second position to align the piston assembly.

18 Claims, 12 Drawing Sheets

(56) References Cited

U.S. PATENT DOCUMENTS

2004/0123733 A1* 7/2004 Yamamoto ............ F16H 19/043
  92/136
2008/0230274 A1* 9/2008 Stubstad ................ E21B 21/02
  175/57
2010/0206575 A1* 8/2010 Theiss ................... E21B 33/043
  166/368

* cited by examiner

SEAL DELIVERY SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Oil and natural gas is extracted from a variety of locations including subsea locations. In subsea environments, wells are drilled into the ocean floor enabling oil and natural gas to be extracted to the surface using a variety of pipes and connections. However, the high-pressures and cold temperatures in a subsea environment may facilitate formation of hydrates that can slow or block the flow of natural gas and oil. Accordingly, chemicals may be pumped into the pipes to reduce hydrate formation. Unfortunately, seals that enable chemical injection may wear allowing natural gas and oil to escape.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

The disclosed embodiments include a seal delivery system that enables sealing of a bore in a subsea environment without retrieving subsea equipment from the ocean floor. In operation, the seal delivery system delivers and actuates a bridge seal assembly in a bore to seal an interface between two components of a subsea mineral extraction system. The seal delivery system includes a mandrel that delivers the seal tool to a target bore within the subsea mineral extraction system. The seal delivery system may include a gear system that rotates the seal tool into alignment with the target bore and a piston assembly that actuates the bridge seal assembly. Specifically, the seal tool may include a piston assembly that actuates to form a seal with the bridge seal assembly.

Figure 1:
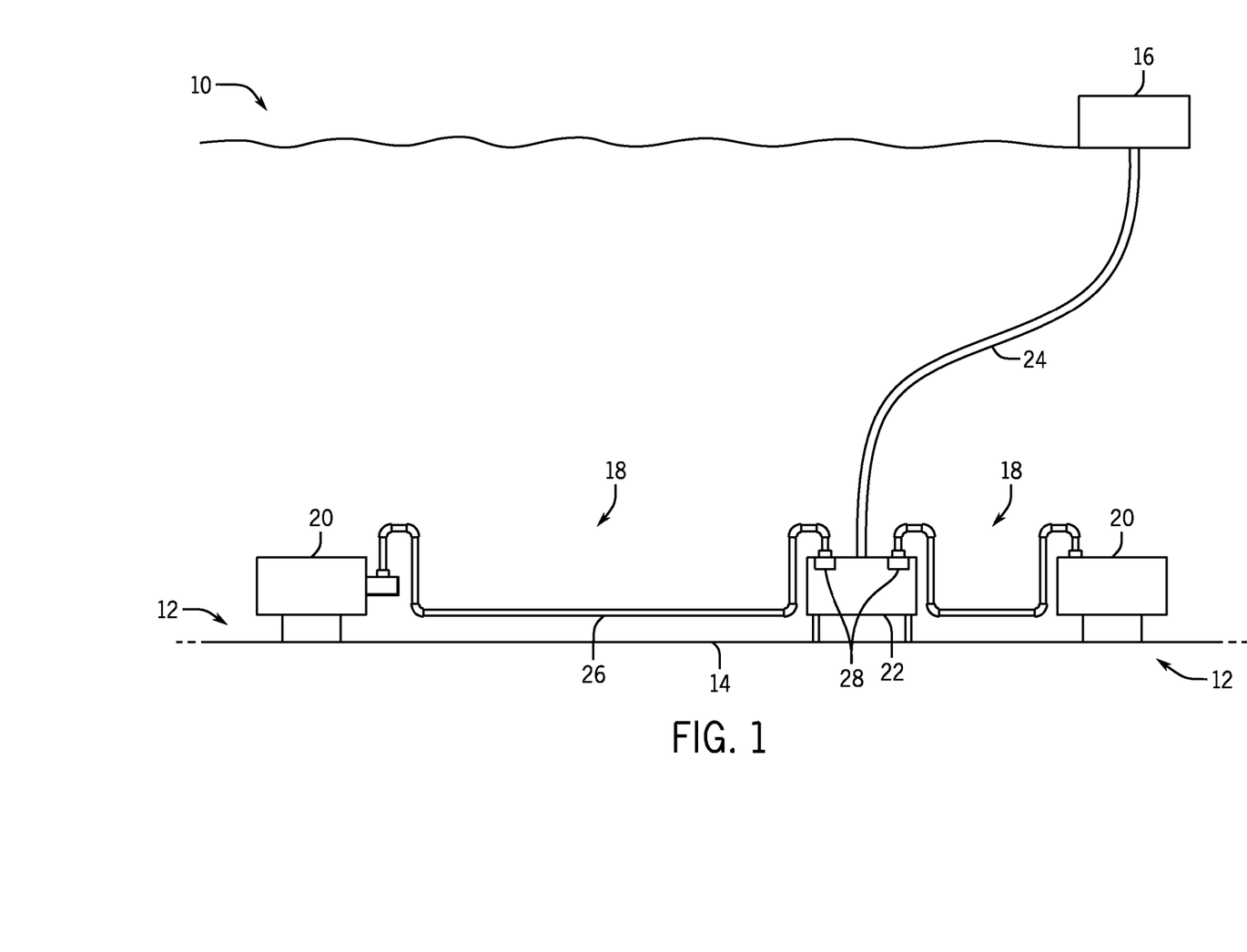
FIG. 1 is a schematic diagram of an embodiment of a sub-sea resource extraction system with a valve block assembly.

FIG. 1 is a schematic diagram of an embodiment of a sub-sea resource extraction system 10. The sub-sea mineral extraction system 10 may be used to extract oil and natural gas from wells 12, located on an ocean floor 14, to an extraction point 16 (e.g., an on-shore processing facility, an off-shore rig, or any other extraction point) at a surface location. The sub-sea resource extraction system 10 includes a jumper system 18 that connects Christmas trees 20 to a manifold 22. In operation, natural resources exiting the well 12 pass through the Christmas trees 20 and through the jumper system 18 to the manifold 22. As illustrated, the jumper system 18 may include a series of pipes 26 that connect the Christmas tree 20 to the manifold 22. From the manifold 22, the natural resources are transported to the extraction point 16 via export flow lines 24.

In order to control the flow of natural resources from the Christmas trees 20, the manifold 22 may include one or more valve block assemblies 28 (e.g., 1, 2, 3, 4, 5, or more). For example, there may be one valve block assembly 28 for each well 12 that couples to the manifold 22. In operation, the valve block assemblies 28 enable the mineral extraction system 10 to control the flow of natural resources through the manifold 22 to the extraction point 16. The valve block assemblies 28 may also aid in the extraction of resources through the resource extraction system 10 by enabling chemical injection. For example, the valve block assembly 28 may enable chemical injection to block the formation of hydrates within the mineral extraction system 10. Hydrates may potentially form in natural gas processing when liquid water condenses trapping methane gas in a crystalline lattice structure. Hydrates typically do not form during normal extraction operations because the temperature of the natural gas is high enough to prevent condensation of water. However, if the mineral extraction system 10 shuts down then the temperature of the surrounding water may cool components in the mineral extraction system 10 allowing the formation of hydrates. In order to block the formation of hydrates either during operation or during shutdown, the mineral extraction system may inject chemicals (e.g., ethylene glycol, methanol) that slow or block hydrate formation by lowering the temperature at which water condenses. Unfortunately, seals on the valve block assembly 28 that enable chemical injection may wear or degrade over time.

Figure 2:
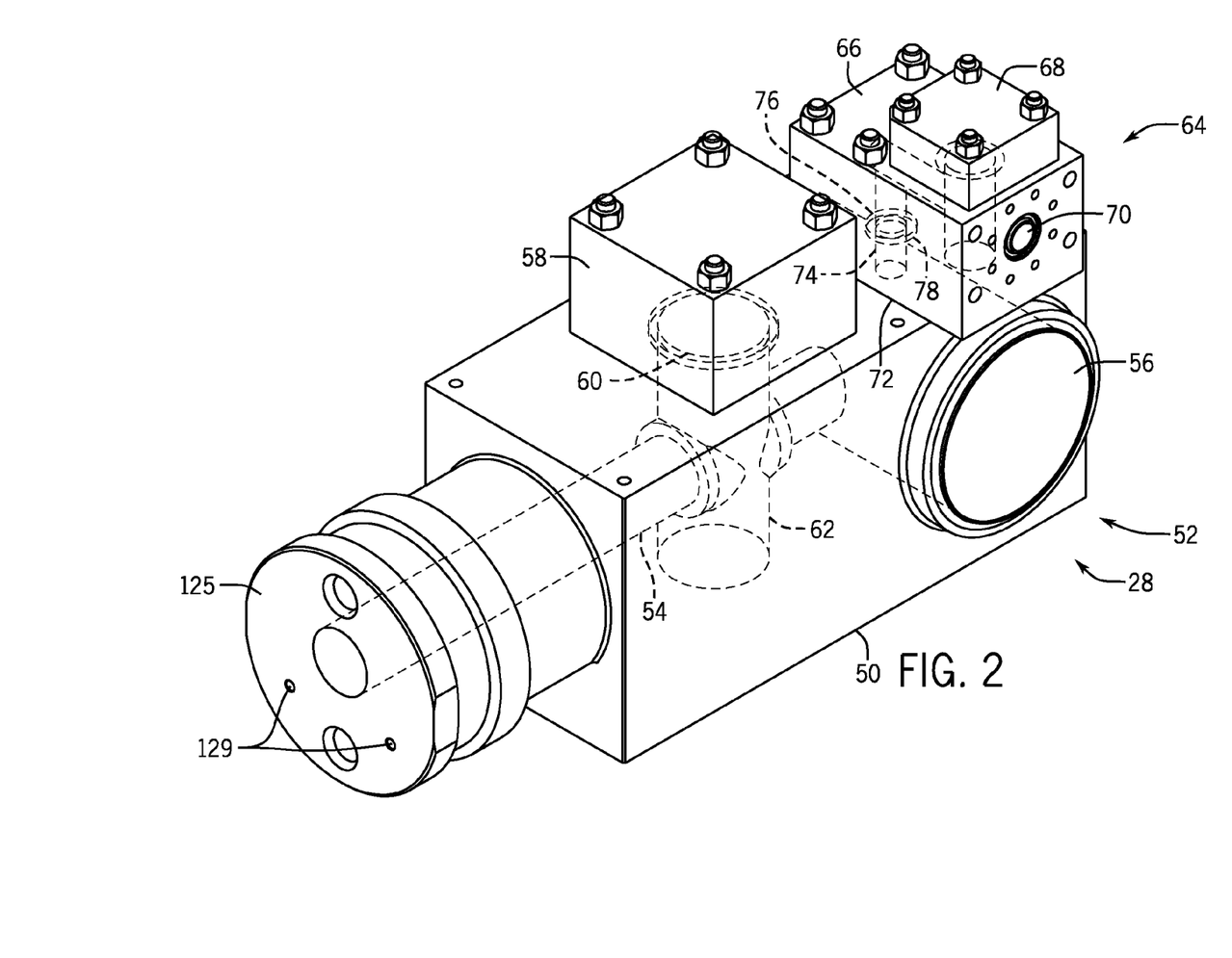
FIG. 2 is a perspective view of an embodiment of a valve block assembly.

FIG. 2 is a perspective view of an embodiment of a valve block assembly 28. As illustrated, the valve block assembly 28 includes a valve block 50 with multiple bores 52. For example, the valve block 50 may include a first bore 54 that fluidly coupled to the pipes 26 of the jumper system 18, enabling fluid flow from the well 12 to enter the manifold 22. The first bore 54 extends through the valve block 50 and fluidly couples with a second bore 56 (e.g., crosswise, perpendicularly). As illustrated, the second bore 56 may be larger than the first bore 54 and directs natural resources through the manifold 22 to the export flow lines 24. In order to control the amount of fluid passing through the export flow lines 24, the valve block assembly 28 may include a valve 58 (e.g., a gate valve). In operation, the valve 58 opens and closes a gate 60 within a valve bore 62 to control fluid flow through the first bore 54.

As explained above, the valve block assembly 28 enables chemical injection into the mineral extraction system 10 to block or reduce the formation of hydrates. In order to inject chemicals, the valve block assembly 28 includes a chemical injection system 64. The chemical injection system 64 includes a chemical injection block 66 that couples to the valve block 50 and a chemical injection valve 68. The chemical injection system 64 receives chemicals from an external source that couples to a chemical injection bore 70 on the chemical injection block 66. In operation, the chemical injection valve 66 open and closes enabling chemicals (e.g., methanol) from the external source to pass through the chemical injection block 66 and into the valve block 50. Specifically, the chemicals pass through the interface 72 between the valve block 50 and the chemical injection block 66 where the chemicals enter a chemical injection passageway 74 in the valve block 50. As illustrated, the chemical injection bore 74 fluidly couples to the second bore 56 that carries natural resources through the manifold 22. In order to block natural resources from escaping between the chemical injection block 66 and the valve block 50, the valve block assembly 50 includes a seal 76 (e.g., annular seal) that rests within a groove 78 (e.g., annular groove) at the interface 72. Unfortunately, the seal 76 may wear, requiring maintenance of the valve block assembly 28 in a subsea environment.

Figure 3:
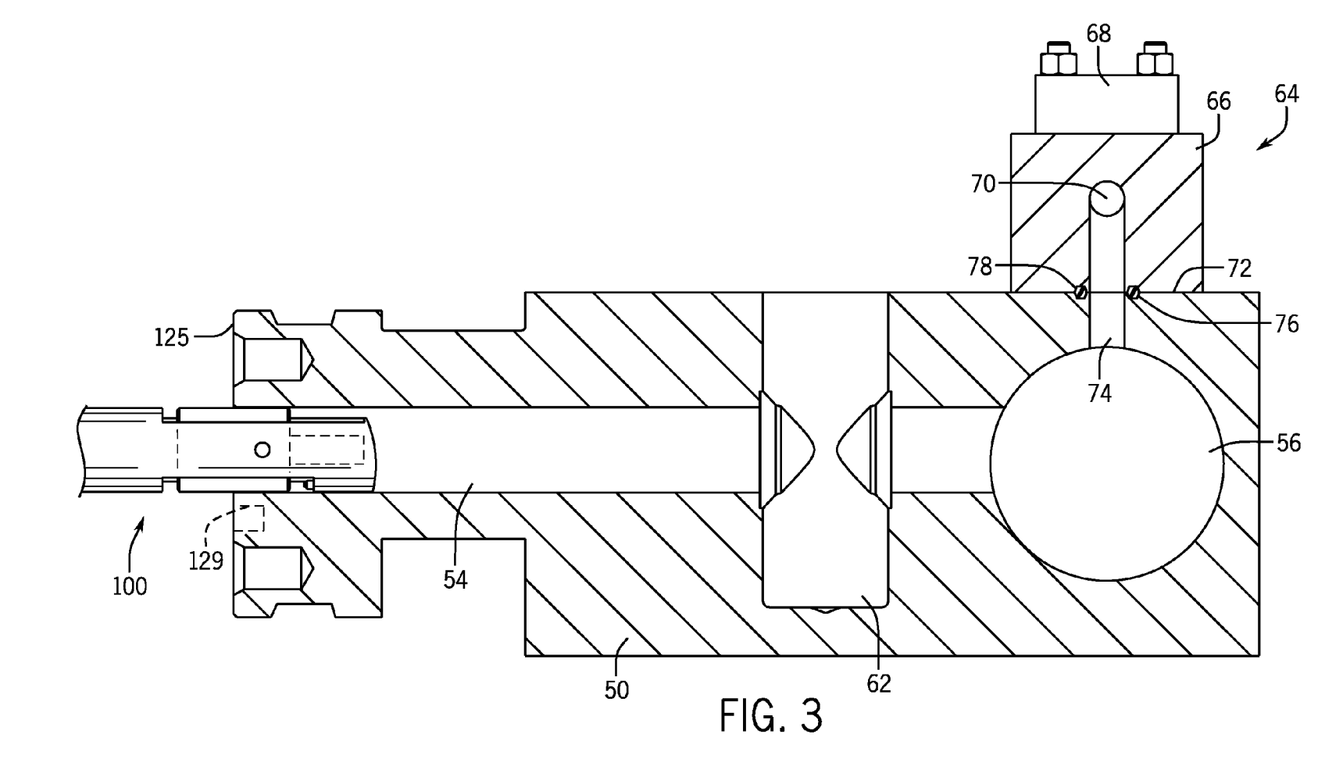
FIG. 3 is a cross-sectional view of an embodiment of the valve block assembly without the valve.

FIG. 3 is a cross-sectional view of the valve block assembly 28 without the valve 58. As will be explained in further detail below, the seal 76 is serviced with a seal delivery system 100 from within the valve block assembly 78. In order to insert the seal delivery system 100, the valve 58 may be removed. After removal of the valve 58, the seal delivery system 100 may be inserted all the way through the first bore 54 and into the second bore 56.

Figure 4:
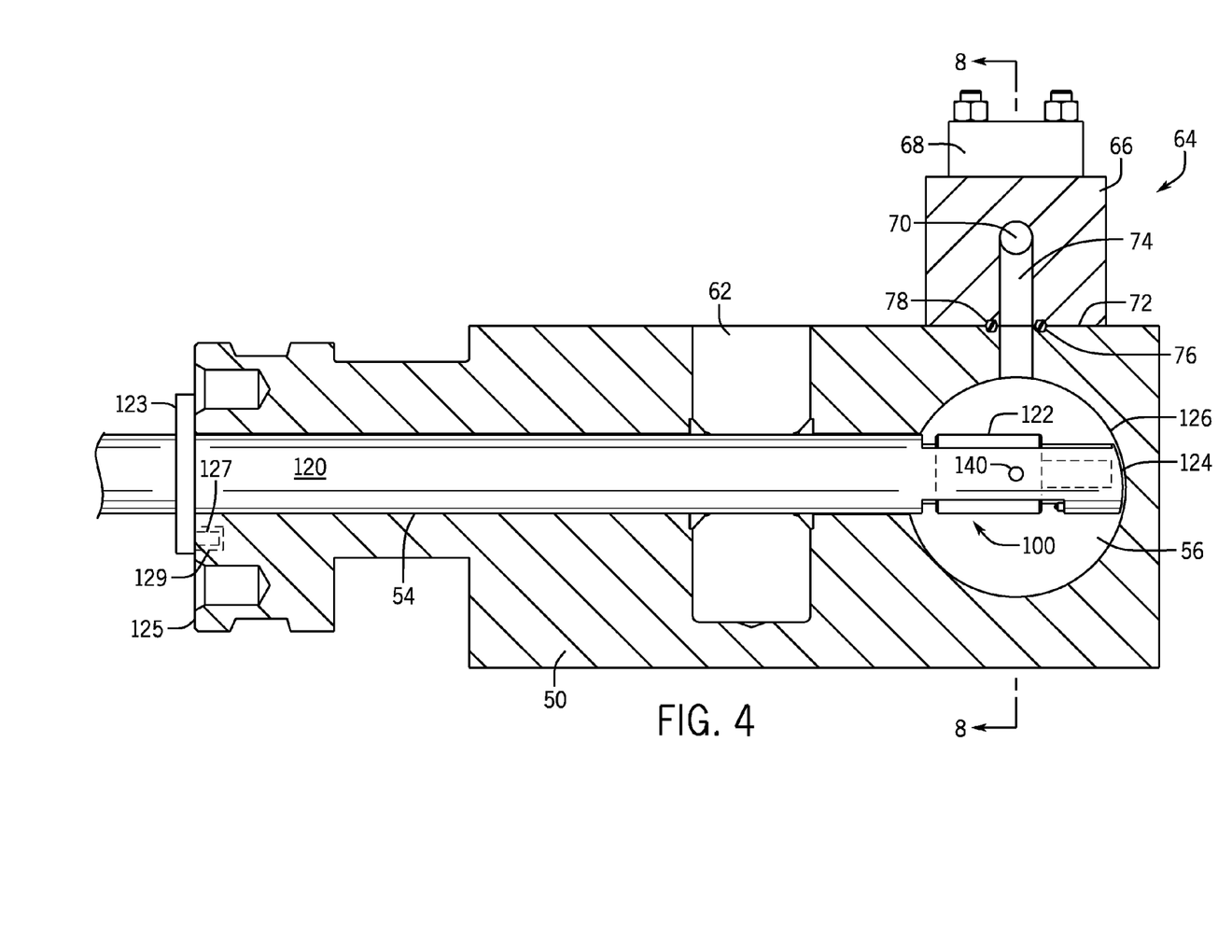
FIG. 4 is a cross-sectional view of an embodiment of the valve block assembly with the seal delivery system.

FIG. 4 is a cross-sectional view of an embodiment of the valve block assembly 78 with the seal delivery system 100. The seal delivery system 100 includes a mandrel 120 and a seal tool 122 (e.g., a seal maintenance tool). As illustrated, the mandrel 120 is inserted through the first bore 54 until a flange 123 contacts the hub face 125 on the valve block 50 to position the first end 124 of the mandrel 120 at the correct depth in the first bore 54. In some embodiments, the mandrel 120 may include orienting pins 127 (e.g., 1, 2, 3, 4, 5 or more) on the flange 123 that engage the apertures 129 in the valve block 50, which orient the mandrel 120 within the bore 54. As illustrated, the first end 124 of the mandrel 120 nearly contacts an interior surface 126 of the second bore 56. In some embodiments, the first end 124 of the mandrel 120 may have a radius of curvature equal to or substantially equal to the radius of curvature of the second bore 56 to facilitate alignment of the seal tool 122 within the valve block assembly 28.

Figure 5:
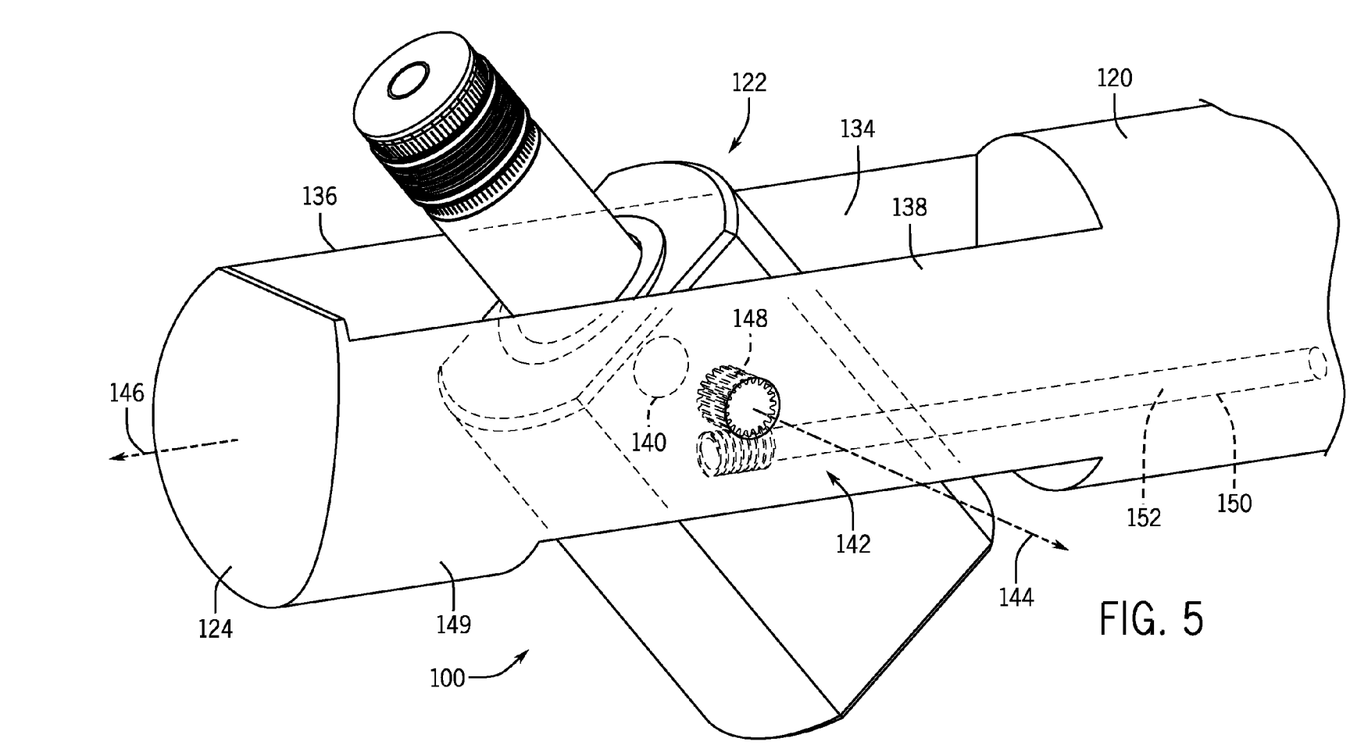
FIG. 5 is a perspective view of an embodiment of the seal delivery system.

FIG. 5 is a perspective view of an embodiment of the seal delivery system 100 with the seal tool 122 partially rotated. As illustrated, the seal tool 122 rests within a cavity 134 formed by first and second sidewalls 136 and 138, of the mandrel 120. The seal tool 122 couples to the first and second sidewalls 136, 138 with a rotatable joint 140 (e.g., pin) in the first sidewall 136 and a worm gear system 142 in the second sidewall 138. The pin 140 enables the worm gear system 142 to rotate the seal tool 122 about the axis 144 from a first position where the seal tool 122 is aligned with the axis 146 of the mandrel 120, to a second position where the seal tool 122 is crosswise (e.g., perpendicular to or substantially perpendicular) to the axis 146 of the mandrel 120. The worm gear system 142 may include a gear 148 (e.g., a spur gear) that couples the seal tool 122 to a second sidewall 138 of the mandrel 120 and rotates about the axis 144. The worm gear system 142 may also include a worm gear 150 that extends through a bore 152 on the second sidewall 138 of the mandrel 120.

Figure 6:
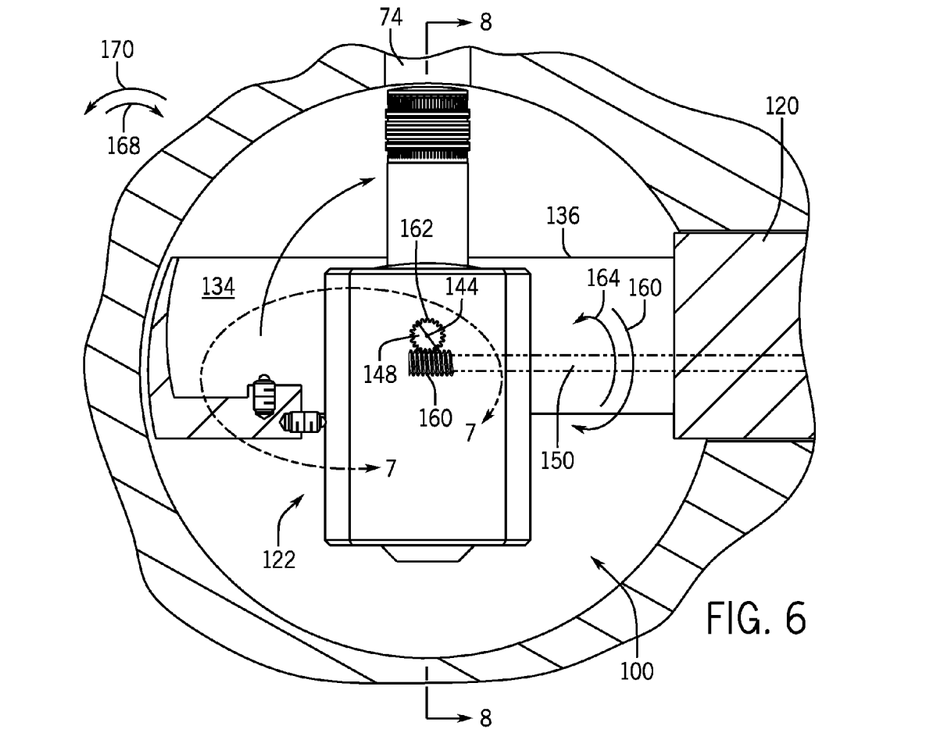
FIG. 6 is a cross-sectional view of an embodiment of a worm gear system within the seal delivery system.

FIG. 6 is a cross-sectional view of an embodiment of a worm gear system 142 within the seal delivery system 100. As illustrated, the worm gear 150 includes threads 160 that mesh with gear teeth 162 on the gear 148. During operation, rotation of the worm gear 150 in either circumferential directions 164 or 166 enables the threads 160 to contact and move the teeth 162 on the gear 148. As the teeth 162 move, the gear 148 rotates in a clockwise or counterclockwise direction 168, 170. As explained above, on the opposite side of the mandrel 120 (i.e., sidewall 136) the seal tool 122 couples to the mandrel 120 with a pin 140. Accordingly, rotation in the clockwise and counter-clockwise directions 168, 170 of the gear 148 enables the seal tool 122 to rotate from a first positioned where the seal tool 122 is aligned with the mandrel 120 and within the cavity 134 to a second position where the seal tool 122 is crosswise (e.g., substantially perpendicular) with respect to the mandrel 120 and vice versa.

Figure 7:
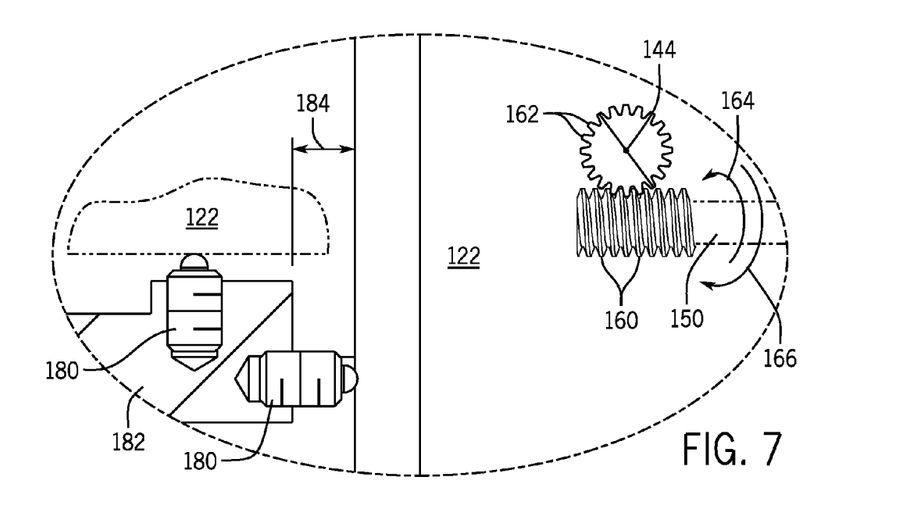
FIG. 7 is a detail view of an embodiment of the seal delivery system within line 7-7 in FIG. 6.

FIG. 7 is a detail view of the seal delivery system 100 within line 7-7 in FIG. 6. As illustrated, the seal delivery system 100 may include one or more ball plungers 180 that facilitate proper alignment of the seal tool 122. For example, the mandrel 120 may include a ledge 182 that has a first ball plunger 180 that blocks over rotation of the seal tool 122 when the seal tool 122 is rotated into alignment with the chemical injection bore 74. Indeed, the ball plunger 180 may extend a specific distance 184 from the ledge 182 that enables the seal tool 122 to align properly with the chemical injection bore 74. In some embodiments, the mandrel 120 may include another ball plunger 180 on the ledge 182 that cushions and blocks over rotation of the seal tool 122 when the seal tool 122 is returned to a position parallel with the mandrel 120. In other embodiments, the ledge 182 may be manufactured to include the proper distance 184 to block over rotation of the seal tool 122.

Figure 8:
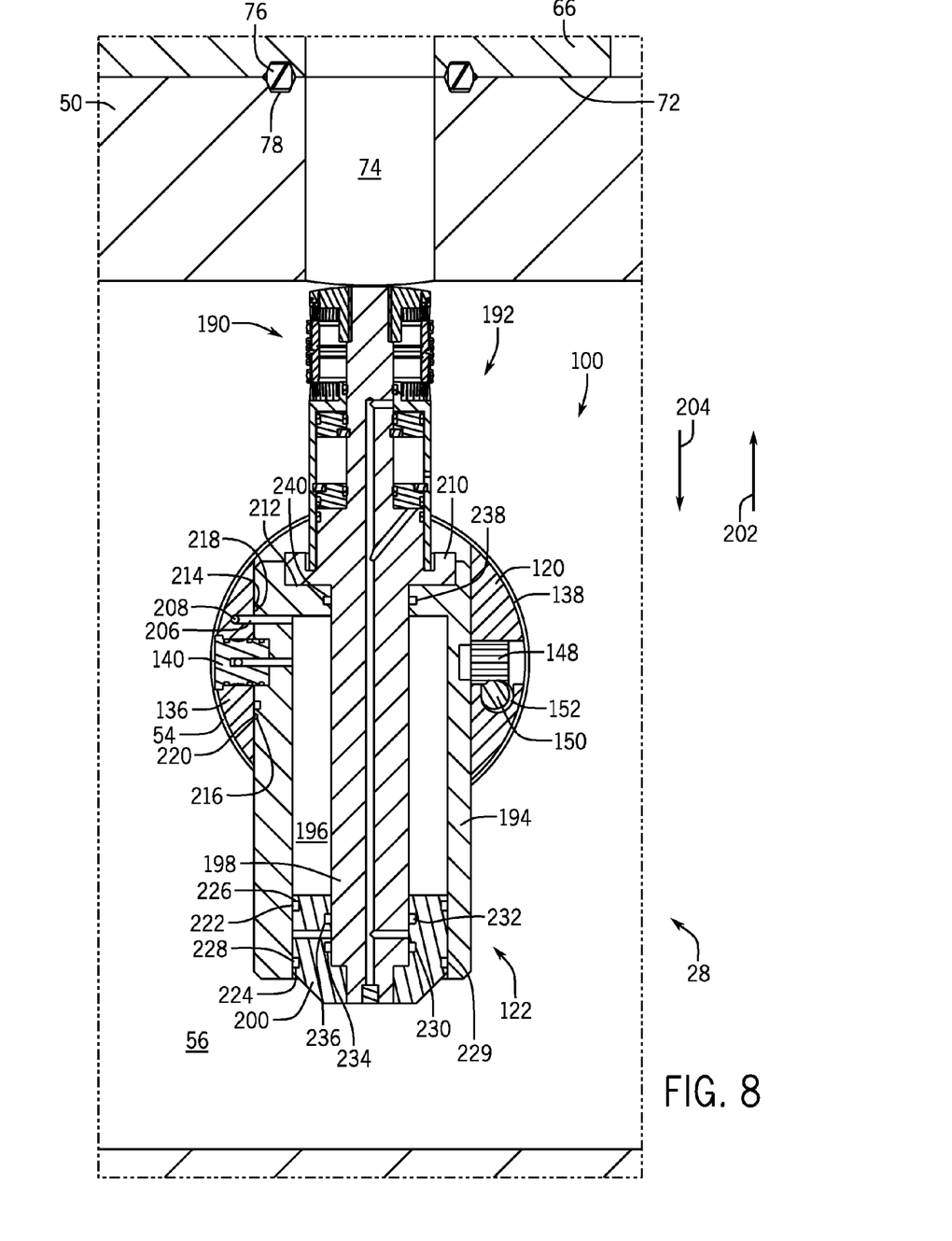
FIG. 8 is a partial cross-sectional view along line 8-8 in FIG. 4 of an embodiment of a seal delivery system with a piston assembly in a contracted position.

FIG. 8 is a partial sectional view along line 8-8 of the valve block assembly 28 with the seal delivery system 100 in a contracted position. As illustrated, rotating the seal tool 122 into a position crosswise (e.g., perpendicular with the mandrel 120 aligns the seal tool 122 with the chemical injection bore 74. In this position, the seal tool 122 may be activated enabling the seal tool 122 to install a bridge seal assembly 190 within the chemical injection bore 74 to seal the interface 72. The seal tool 122 includes a piston assembly 192 and a low-pressure cylinder 194. The low-pressure cylinder 194 couples the seal tool 122 to the mandrel 120 by way of the pin 140 and the gear 148. Accordingly, rotation of the gear 148 rotates the low-pressure cylinder 194 and thereby the seal tool 122. The low-pressure cylinder 194 includes a cylinder bore 196 that receives a piston 198 and a seal block 200 of the piston assembly 192. In operation, the low-pressure cylinder 194 enables a low-pressure fluid to enter and exit the cylinder bore 196, which drives axial movement of the piston assembly 192 (e.g., piston 198, seal block 200). More specifically, the low-pressure cylinder 194 includes a low-pressure aperture 206 that fluidly communicates with a low-pressure port 208 that extends through the mandrel 120. The low-pressure port 208 delivers the low-pressure fluid to the cylinder bore 196, which then creates pressure within the cylinder bore 196, which overcomes seawater pressure acting on the seal block 200. As low-pressure fluid flows into the cylinder bore 196, the fluid drives the seal block 200 and piston 198 in direction 204 until a flange 210 on the piston 198 contacts a counterbore 212 on the low-pressure cylinder 194. As will be explained in detail below, the pressure within the low-pressure cylinder 194 is maintained until the seal tool 122 is rotated into alignment with the chemical injection bore 74. Once aligned, pressure is removed from the fluid in the cylinder bore 196 enabling pressurized seawater to drive the seal block 200 and piston 198 in direction 202 forcing the fluid out of the low-pressure cylinder 194 and through the low-pressure port 208.

To facilitate operation, the seal delivery system 100 may include multiple seals. For example, the seal delivery system 100 may include seals 214 and 216 (e.g., annular seals) that rest within grooves 218 and 220 (e.g., annular grooves) on the low-pressure cylinder 194, which form a seal between the mandrel 120 and the low-pressure cylinder 194. The seal delivery system 100 may also include seals 222 and 224 (e.g., annular seals) that rest within grooves 226 and 228 (e.g., annular grooves) on an outer surface 229 of a seal block 200. The seals 222 and 224 form a seal between the low-pressure cylinder 194 and the seal block 200. To block fluid flow from exiting the low-pressure cylinder 194 between the piston 198 and the seal block 200, the seal block 200 may include seals 230 and 232 (e.g., annular seals) that rest within grooves 234 and 236 (e.g., annular grooves). Finally, the seal delivery system 100 may include a seal 238 (e.g., annular seal) within a groove 240 (e.g., annular groove) that blocks fluid from leaking between the piston 198 and the low-pressure cylinder 194.

Figure 9:
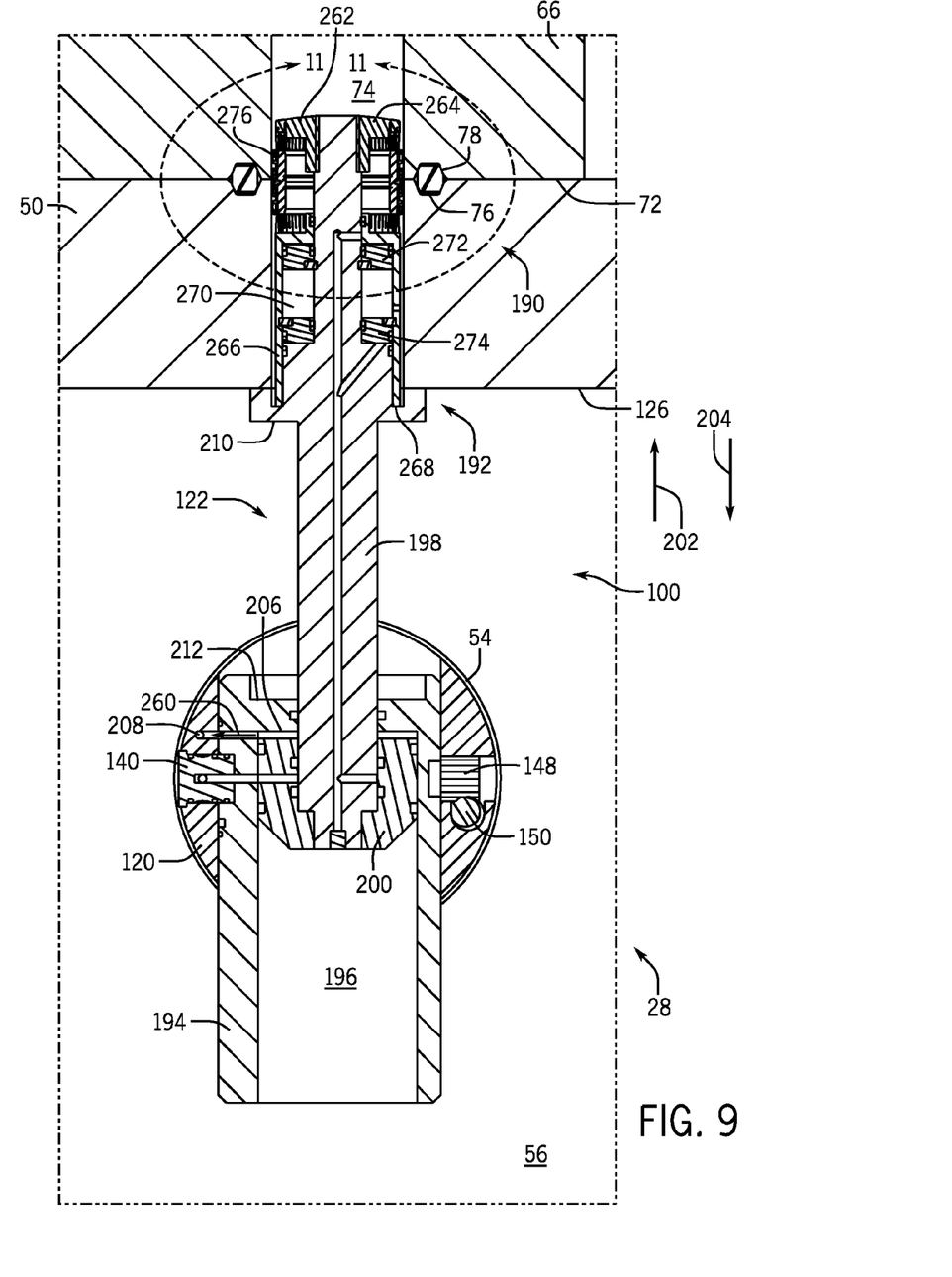
FIG. 9 is a partial cross-sectional view of an embodiment of the seal delivery system with the piston assembly in an extended position.

FIG. 9 is a partial sectional view of the valve block assembly 28 with the seal delivery system 100 in an extended position. After rotating the seal tool 122 into alignment with the chemical injection bore 74, the seal delivery system 100 removes pressure on the fluid 260 in the cylinder bore 196. Without pressure on fluid 260, the pressure of the seawater drives the seal block 200 in direction 202 forcing fluid 260 out of the cylinder bore 196, through the low-pressure aperture 206, and into the low-pressure port 208. As the seal block 200 moves in direction 202, the seal block 200 drives the piston 198, the bridge seal assembly 190, and the piston assembly 192 into the chemical injection bore 74. In order to axially align and block overextension of the bridge seal assembly 190, the piston 198 includes the flange 210 and a head 262. As illustrated, the head 262 couples to the piston 198 (e.g., threadingly couples or formed as one-piece with the piston 198) and includes a rounded surface 264. As the piston 198 moves in axial direction 202, the head 262 may contact the interior surface 126 of the second bore 56. If contact occurs between the head 262 and the interior surface 126, the rounded surface 264 enables the head 262 to slide against the interior surface 126 and into the chemical injection bore 74 thereby facilitating alignment of the head 262 with the chemical injection bore 74. Once the bridge seal assembly 190 and the piston assembly 192 enters the chemical injection bore 74, the piston flange 210 contacts the interior surface 126 of the second bore 56 blocking overextension of the piston 198 into the chemical injection bore 74, thus aligning the bridge seal assembly 190 with the interface 72.

As illustrated, the bridge seal assembly 190 couples to the piston assembly 192 enabling the piston 198 to axially move the bridge seal assembly 190 into position. Once in position, the piston assembly 192 activates the bridge seal assembly 190 enabling the bridge seal assembly 190 to form a seal at the interface 72 between valve block 50 and the chemical injection block 66. The piston assembly 192 includes the piston 198, the head 262, and a high-pressure cylinder 266, that rests within a counterbore 268 of the piston flange 210. As illustrated, the high-pressure cylinder 266 surrounds the piston 198 forming a chamber 270. Within the chamber 270, the piston assembly 192 includes first and second annular rings 272 and 274. In operation, the annular rings 272 and 274 enable high-pressure fluid entering the high-pressure cylinder 66 to drive the high-pressure cylinder 266 in axial direction 202 and the piston 198 in direction 204. As will be explained in more detail below, as the piston 198 moves in direction 204 and the high-pressure cylinder 266 moves in axial direction 202, the piston assembly 192 compresses the bridge seal assembly 190 between the high-pressure cylinder 266 and the head 262 driving a bridge seal 276 radially outward forming a seal about the interface 72.

Figure 10:
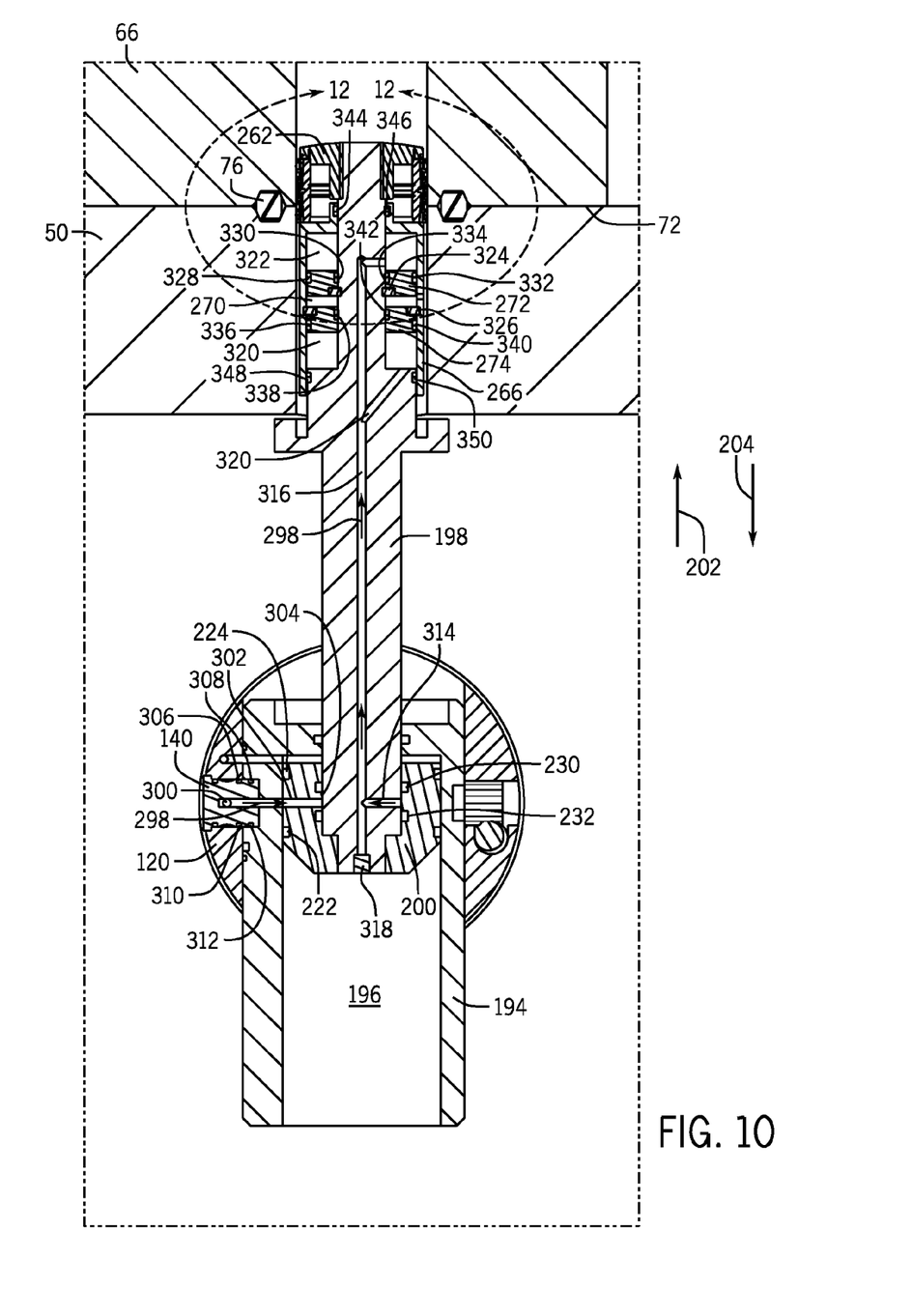
FIG. 10 is a partial cross-sectional view of an embodiment of the valve block assembly with an actuated bridge seal assembly.

FIG. 10 is a partial sectional view of the valve block assembly 28 with an actuated bridge seal assembly 192. In operation, high-pressure fluid 298 is pumped through a high-pressure port 300 in the mandrel 120. After passing through the mandrel 120, the high-pressure fluid 298 passes through an aperture 302 that extends through the pin 140 and the seal block 200 to a small gap 304 between the piston 198 and the seal block 200. In order to control fluid flow through the aperture 302, the seal delivery system 100 may use multiple seals. For example, the seal delivery system 100 may include seals 306 and 308 (e.g., annular seals) that rest within grooves 310 and 312 on the pin 140, which form a seal between the pin 140 and the low-pressure cylinder 194. The seal delivery system 100 may also include seals 222 and 224 (e.g., annular seals) that form a seal between the low-pressure cylinder 194, and include the seals 230 and 232 (e.g., annular seals) that form a seal between the seal block 200 and the piston 198. Accordingly, the fluid 298 is channeled into the gap 304 between the seal block 200 and the piston 198. As the fluid 298 enters this gap 304, the seals 230 and 232 contain the fluid 298 enabling the fluid to flow around the piston 198 before entering the radial aperture 314. As illustrated, the radial aperture 314 is fluidly coupled to an axial aperture 316 that then conducts the fluid 298 through the piston 198 to the chamber 270 in the piston assembly 192. In order to block fluid from exiting piston 318 into the cylinder bore 196, the piston 198 may include a plug 318.

After passing through the axial aperture 316, the fluid 298 reaches a split 320 that divides the fluid 298 so that some of the fluid enters the chamber 270 below the annular ring 274 and some of the fluid 298 enters the chamber 270 above the annular ring 272. In other words, some of the high-pressure fluid 298 enters a chamber 320 formed between the annular ring 274 and the piston 198, and some of the high-pressure fluid 298 enters a chamber 322 formed between the annular ring 272 and the high-pressure cylinder 266. As the high-pressure fluid 298 enters these chambers 320 and 322, the high-pressure fluid 298 moves the annular rings 272 and 274 and by extension the piston 198 and the high-pressure cylinder 266. For example, the annular rings 272 and 274 include respective connector rings 324 and 326 that respectively couple the annular rings 272, 274 to the piston 198 and the high-pressure cylinder 266. Accordingly, during operation, the high-pressure fluid 298 entering the chambers 320 and 322 is able to drive the piston 198 in axial direction 204 and the high-pressure cylinder 266 in direction 202. As the piston 198 moves in direction 204 and the high-pressure cylinder 266 moves in axial direction 202, the piston assembly 192 compresses the bridge seal assembly 190 between the high-pressure cylinder 266 and the head 262 driving a bridge seal 276 radially outward forming a seal about the interface 72.

In order maintain pressure within the chambers 320 and 322, the annular rings 272 and 274, as well as the piston 198 may include multiple seals. For example, the annular ring 272 may include seals 328 and 330 (e.g., annular seals) that rest within grooves 332 and 334 which form respective seals with the high-pressure hydraulic cylinder 266 and the piston 198. The annular ring 274 may also include seals 336 and 338 (e.g., annular seals) that rest within grooves 340 and 342 which form respective seals with the high-pressure hydraulic cylinder 266 and the piston 198. Moreover, the cylinder 266 may include a seal 344 within a groove 346, and the piston 198 may include a seal 348 (e.g., annular) within a groove 350. In operation, the seals 328 and 330 on the annular ring 272 work with the seal 344 to contain the high-pressure fluid 298 within the chamber 322. Likewise, the seals 336 and 338 on the annular ring 274 work with the seal 348 to contain the high-pressure fluid 298 within the chamber 320.

Figure 11:
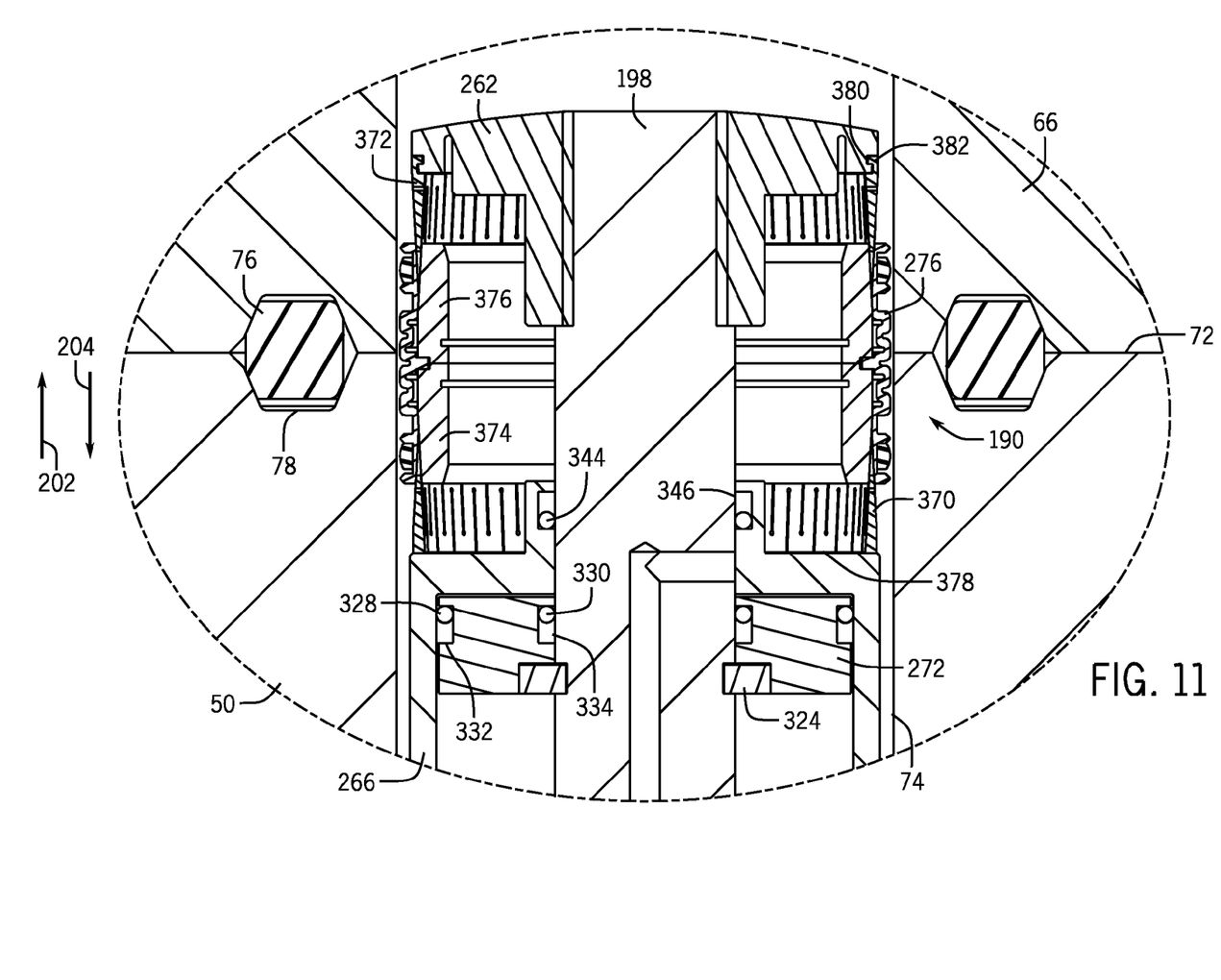
FIG. 11 is a detail view within line 11-11 of FIG. 9 of an embodiment of a bridge seal assembly in an unactuated position.

FIG. 11 is a detail view of the bridge seal assembly 190 in an unactuated position within line 11-11 of FIG. 9. The bridge seal assembly 190 includes a bridge seal 276 (e.g., annular); wedge rings 370 and 372; and reaction rings 374 and 376. As illustrated, the bridge seal assembly 190 rests between the head 262 and the high-pressure cylinder 266. Specifically, the wedge ring 370 rests on an end surface 378 of the high-pressure cylinder 266, while the wedge ring 372 couples to the head 262. For example, the head 262 may include a groove 380 (e.g., annular groove) that receives protrusion 382 (e.g., an annular protrusion) on the wedge ring 372. In order to actuate the bridge seal assembly 190, high-pressure fluid 298 is pumped into the high-pressure cylinder 266. As the high-pressure fluid 298 enters the high-pressure cylinder 266, the pressure drives the annular ring 272 in direction 204 and the annular ring 274 in direction 202 and by extension the piston 198 in direction 204 and high-pressure cylinder 266 in direction 202. The movement of the piston 198 in direction 204 and the high-pressure cylinder 266 in direction 202 energizes the bridge seal assembly 190, which forms a seal at the interface 72. More specifically, as the piston 198 moves in direction 202, the head 262 contacts and drives the wedge ring 372 between the bridge seal 276 and the reaction ring 376. Simultaneously, the movement of the high-pressure cylinder 266 in direction 202 drives the wedge ring 370 between the bridge seal 276 and the reaction ring 374. Together, the wedge rings 372 and 374 and the reaction rings 374 and 376 radially drive the bridge seal 276 into contact with the chemical injection bore 74. As illustrated, the bridge seal assembly 190 may include two reaction rings 374 and 376 that interact separately with the respective wedge rings 370, 372, thereby enabling the bridge seal assembly 190 to seal despite variations in tolerance in the chemical injection bore 74 between the chemical injection block 66 and the valve block 50.

Figure 12:
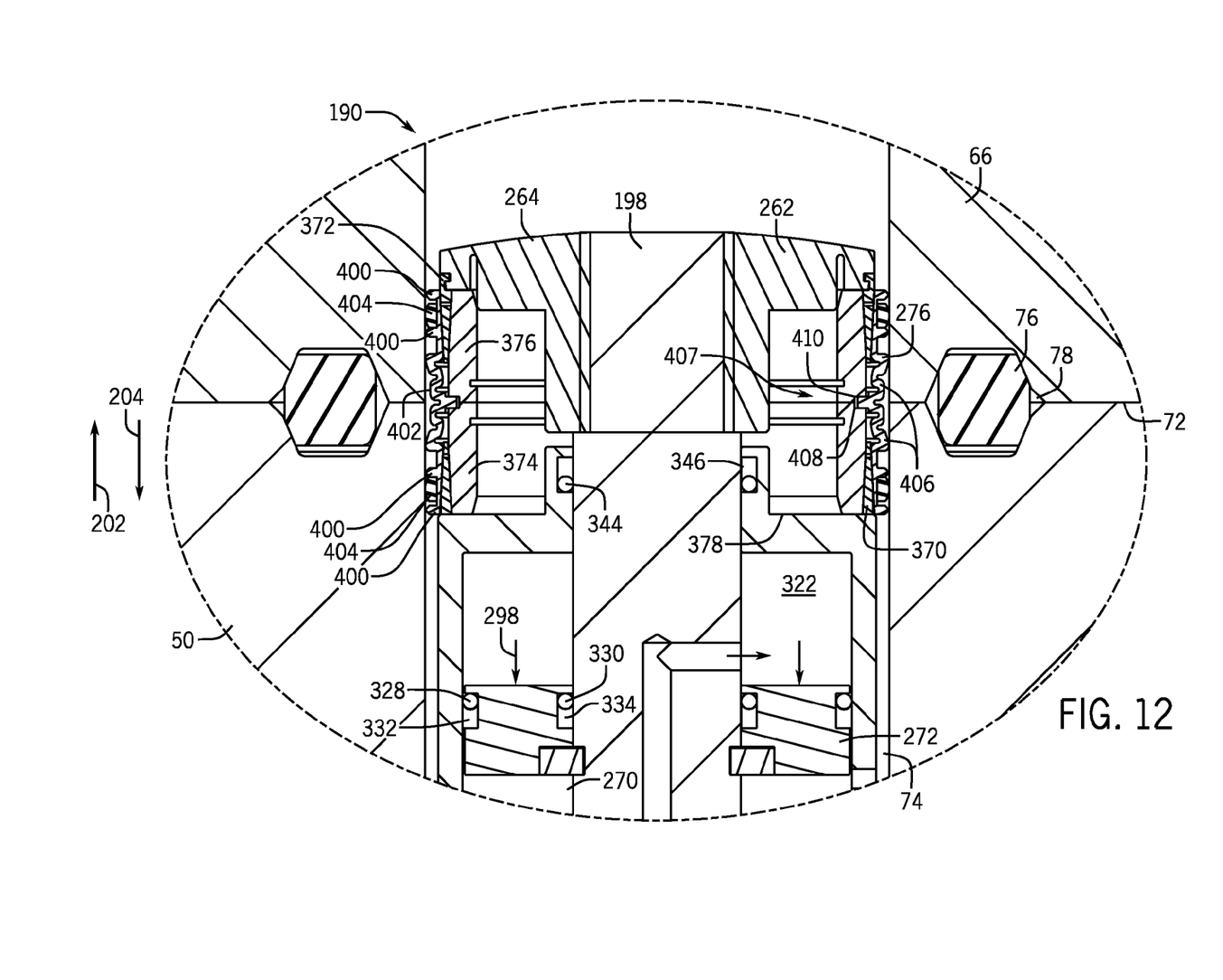
FIG. 12 is a detail view within line 12-12 of FIG. 10 of an embodiment of the bridge seal assembly in an actuated position.

FIG. 12 is a detail view of the bridge seal assembly 190 in an actuated position within line 12-12 of FIG. 10. As explained above, as high-pressure fluid 298 enters the high-pressure cylinder 266, the pressure forces the annular ring 272 and piston 198 in direction 204, and the annular ring 274 and high-pressure cylinder 266 in direction 202. The movement of the piston 298 in direction 204 and the high-pressure cylinder 266 drives the wedge rings 370 and 372 in opposite directions between the bridge seal 276 and the respective reaction rings 374 and 376. As the wedge rings 370 and 372 wedge between the bridge seal 276 and the reaction rings 374 and 376, the bridge seal 276 is driven into the chemical injection block 66 and the valve block 50 forming a seal around the interface 72. As illustrated, the bridge seal 276 may include two or more annular protrusions 400 connected by a bridge seal body portion 402. When actuated, the protrusions 400 of the bridge seal 276 are driven into the chemical injection block 66 and the valve block 50 by the force of the wedge rings 370 and 372 contacting the reaction rings 374 and 376, which maintains the bridge seal 276 in position around the interface 72. In order to form the seal around the interface 72, the bridge seal 276 includes one or more gaskets 402 (e.g., annular gaskets) positioned between the protrusions 400 that block fluid from exiting or entering the chemical injection bore 74 through the interface 72. In some embodiments, the bridge seal 276 may include two annular protrusions 400 that contact the chemical injection block 66 and two annular protrusions 400 that contact the valve block 50. In some embodiments, the bridge seal 276 may include a gasket 404 between the two sets of protrusions 400, with each gasket 404 sealing on opposing sides of the interface 72. Moreover, some embodiments of the bridge seal 276 may include an accordion shaped body portion 402. For example, the accordion shaped body portion 402 may be an annular wall with zigzagging wall portions or foldable wall portions 406. In operation, the folds 406 enable the bridge seal 276 to maintain the seal by expanding and contracting as the valve block 50 and chemical injection block 66 expand and contract. In some embodiments, the bridge seal 276 may couple to the reaction rings 374 and 376 with a protrusion 408 that rests within a groove 410. The protrusion 408 and groove 410 work together to block movement of the bridge seal 276 during insertion as well as after actuation of the bridge seal assembly 190.

Figure 13:
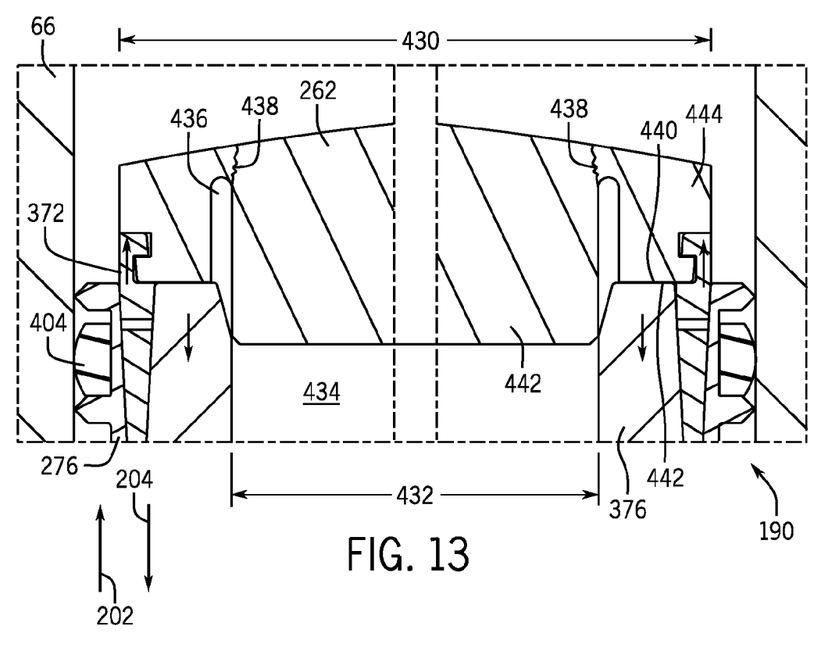
FIG. 13 is a detail view of an embodiment of a bridge seal assembly in an actuated position.

FIG. 13 is a detail view of the bridge seal assembly 190 in an actuated position. After actuation of the bridge seal assembly 190, the seal delivery system 100 is withdrawn by lowering the piston assembly 192 and rotating the seal tool 122 into alignment with the mandrel 120 (i.e., reversing the process of insertion illustrated in FIGS. 3-10). As illustrated, the removal head 264 has a diameter 430 that is larger than a diameter 432 of the aperture 434 in the reaction rings 374 and 376. Accordingly, some embodiments of the head 262 may include an annular groove 436 that enables the head to preferentially crack along lines 438 (e.g., a shear joint). As explained above, high-pressure fluid 298 pumped into the high-pressure cylinder 266 drives the piston 198 in direction 204. As the piston 198 travels in direction 204, the head 262 drives the wedge ring 372 in direction 204 between the bridge seal 276 and the reaction ring 376. The head 262 continues to move in direction 204 until a ledge 440 (e.g., annular ledge) contacts the top surface 442 of the reaction ring 376. When the ledge 440 and the reaction ring 376 contact the reaction ring 376 resists further movement of the head 262 in direction creating stress on the head 262 that is focused by the groove 436. The groove 436 focuses this stress along lines 438 enabling the head 262 break into two or more pieces. Once broken the head 262 includes a removable portion 442 and a portion 444 that is left behind. As illustrated, the removable portion 442 of the head 262 has a width less than or equal to the diameter 432 of the aperture 434. Accordingly, the seal delivery system 100 may be withdrawn through the bridge seal assembly 190 after installation of a bridge seal assembly 190.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
    a seal delivery system, comprising:
        a mandrel;
        a seal tool coupled to the mandrel, wherein the seal tool is configured to deliver and actuate a bridge seal assembly; and
        a gear system coupled to the mandrel and to the seal tool, wherein the gear system is configured to rotate the seal tool from a first position in which a central axis of the seal tool is aligned with a longitudinal axis of the mandrel to a second position in which the central axis of the seal tool is crosswise to the longitudinal axis of the mandrel to facilitate delivery and actuation of the bridge seal assembly.

2. The system of claim 1, wherein the mandrel comprises a first axial passage configured to receive a worm gear.

3. The system of claim 2, wherein the mandrel comprises a second axial passage configured to receive a first fluid at a first pressure to block extension of a piston assembly.

4. The system of claim 3, wherein the mandrel comprises a third axial passage configured to receive a second fluid at a second pressure that actuates the bridge seal assembly.

5. The system of claim 4, wherein the seal tool comprises a first cylinder that fluidly couples to the second axial passage and is configured to receive the second fluid.

6. The system of claim 5, wherein the seal tool comprises a second cylinder that fluidly couples to the third axial passage and is configured to receive the third fluid.

7. The system of claim 1, wherein the seal tool comprises a piston assembly comprising a piston with a head and a cylinder, and the piston assembly is configured to actuate the bridge seal assembly by compressing the bridge seal assembly between the head and the cylinder.

8. The system of claim 1, wherein the bridge seal assembly comprises an annular bridge seal, a wedge ring, and an reaction ring.

9. The system of claim 1, wherein the seal tool comprises a piston assembly comprising a piston with at least one fluid passage.

10. The system of claim 1, wherein the seal tool comprises a piston assembly comprising a head with a groove, and the groove is configured to preferentially shear the head along a shear joint.

11. A method, comprising:
    rotating a seal tool about a rotational axis from a first position to a second position inside subsea mineral extraction equipment, wherein the rotational axis is crosswise to a longitudinal axis of the seal tool;
    extending a piston assembly coupled to the seal tool to move a bridge seal assembly into a seal region; and
    energizing the bridge seal assembly in the seal region by actuating the piston assembly.

12. The method of claim 11, wherein rotating the seal tool from the first position to the second position comprises rotating a first gear coupled to the seal tool with a second gear.

13. The method of claim 11, wherein extending the piston assembly coupled to the seal tool comprises removing pressure from a first fluid to enable subsea pressure to drive movement of the piston assembly.

14. The method of claim 11, wherein actuating the piston assembly comprises pumping a second fluid at a second pressure into the piston assembly to compress the bridge seal assembly.

15. The method of claim 11, wherein energizing the bridge seal assembly comprises driving a wedge ring between an annular bridge seal and a reaction ring.

16. The method of claim 11, comprising retracting the piston assembly by preferentially shearing a shear joint of the piston assembly.

17. A system, comprising:
    a seal delivery system, comprising:
        a mandrel;
        a seal tool coupled to the mandrel, wherein the seal tool is configured to deliver and actuate a bridge seal assembly; and
        a gear system coupled to the mandrel and to the seal tool, wherein the gear system comprises a worm gear supported within a first axial passage of the mandrel, and wherein the gear system is configured to rotate the seal tool from a first position to a second position to facilitate delivery and actuation of the bridge seal assembly.

18. A system, comprising:
    a seal delivery system, comprising:
        a mandrel;
        a seal tool coupled to the mandrel, wherein the seal tool is configured to deliver and actuate a bridge seal assembly;
        a gear system coupled to the mandrel and to the seal tool, wherein the gear system is configured to rotate the seal tool from a first position to a second position to facilitate delivery and actuation of the bridge seal assembly; and
        a piston assembly comprising a piston with a head and a cylinder, wherein the piston assembly is configured to actuate the bridge seal assembly by compressing the bridge seal assembly between the head and the cylinder.

* * * * *